United States Patent
Chang et al.

(10) Patent No.: US 10,618,986 B2
(45) Date of Patent: Apr. 14, 2020

(54) HYDROPHILIC COPOLYMER WITH PENDANT THIOL GROUPS

(71) Applicant: Novartis AG, Basel (CH)

(72) Inventors: Frank Chang, Cumming, GA (US); Troy Vernon Holland, Suwanee, GA (US); Feng Jing, Snellville, GA (US); Ryan DeSousa, Atlanta, GA (US)

(73) Assignee: Alcon Inc., Fribourg (CH)

( * ) Notice: Subject to any disclaimer, the term of this patent is extended or adjusted under 35 U.S.C. 154(b) by 232 days.

(21) Appl. No.: 15/730,785

(22) Filed: Oct. 12, 2017

(65) Prior Publication Data

US 2018/0105620 A1    Apr. 19, 2018

Related U.S. Application Data

(60) Provisional application No. 62/409,948, filed on Oct. 19, 2016.

(51) Int. Cl.

| | | |
|---|---|---|
| *C08F 28/02* | (2006.01) | |
| *C08F 8/34* | (2006.01) | |
| *C08F 8/48* | (2006.01) | |
| *G02B 1/04* | (2006.01) | |
| *C08F 8/30* | (2006.01) | |
| *C08B 37/00* | (2006.01) | |
| *C08F 24/00* | (2006.01) | |
| *C08F 26/06* | (2006.01) | |
| *G02C 7/04* | (2006.01) | |
| *C08F 20/56* | (2006.01) | |

(52) U.S. Cl.
CPC .......... *C08F 28/02* (2013.01); *C08B 37/0063* (2013.01); *C08F 8/30* (2013.01); *C08F 8/34* (2013.01); *C08F 8/48* (2013.01); *C08F 24/00* (2013.01); *C08F 26/06* (2013.01); *G02B 1/04* (2013.01); *G02B 1/043* (2013.01); *C08F 20/56* (2013.01); *C08F 2810/20* (2013.01); *G02C 7/04* (2013.01)

(58) Field of Classification Search
USPC ............... 525/61, 348; 536/55.2; 527/312
See application file for complete search history.

(56) References Cited

U.S. PATENT DOCUMENTS

| | | | |
|---|---|---|---|
| 3,007,918 A * | 11/1961 | Benesch | C08B 15/06 536/30 |
| 3,408,429 A | 10/1968 | Wichterle | |
| 4,347,198 A | 8/1982 | Ohkada | |
| 4,447,562 A | 5/1984 | Ivani | |
| 5,461,433 A | 10/1995 | Nakabayashi | |
| 5,508,317 A | 4/1996 | Muller | |
| 5,583,463 A | 12/1996 | Merritt | |
| 5,741,923 A | 4/1998 | Driver | |
| 5,789,464 A | 8/1998 | Muller | |
| 5,849,810 A | 12/1998 | Muller | |
| 6,306,977 B1 | 10/2001 | Coppo | |
| 8,529,057 B2 | 9/2013 | Qiu | |
| 9,611,344 B2 | 4/2017 | Kaneshima et al. | |
| 2006/0148983 A1 | 7/2006 | Muller | |
| 2013/0337160 A1 | 12/2013 | Holland | |
| 2014/0350169 A1 | 11/2014 | Kaneshima et al. | |
| 2016/0061995 A1 | 3/2016 | Chang | |

FOREIGN PATENT DOCUMENTS

| | | |
|---|---|---|
| EP | 1465931 A1 | 10/2004 |
| EP | 1465931 B1 | 8/2007 |
| ES | 2491340 B1 | 3/2015 |
| WO | 96/24074 A1 | 8/1996 |
| WO | 2012/082400 A2 | 6/2012 |
| WO | 2013105188 A1 | 7/2013 |

OTHER PUBLICATIONS

Bernkop-Schnurch, et al, "Thiolated chitosans," European Journal of Pharmaceutics and Biopharmaceutics 57 (2004) 9-17. (Year: 2004).*
Ferris, et al., "Synthesis and Characterization of a novel chitosan-N-acetyl-homocysteine thiolactone polymer using MES buffer," Carbohydrate Polymers 111 (2014) 125-132. (Year: 2014).*
Chivangkul, T, et al.; Enhanced water-solubility and mucoadhesion of N,N,N-trimethyl-N-gluconate-N-homocysteine thiolactone chitosan, Carbohydrate Polymers 108, 2014, pp. 224-231.
Juntapram, K, et al.; Synthesis and characterization of chitosan-homocysteine thiolactone as a mucoadhesive polymer, Carbohydrate Polymers 87, 2012, pp. 2399-2408.
C. Ferris, et al.; Synthesis and Characterization of Novel Chitosan-N-Acetyl-Homocysteine Thiolactone Polymer Using MED Buffer; Carbohydrate Polymers 111 (2014) 125-132.
Espeel, P et, al; One-Pot Double Modification of Polymers Based on Thiolactone Chemistry; Adv. Polym Sci (2015) 269: 105-132.
Juntapram, K, et al; Electrosprayed Polyelectrolyte Complexes Between Mucoadhesive N,N,N,-Trimethylchitosan-Homocysteine Thiolactone and Alginate/Carrageenan for Camptothecin Delivery; Carbohydrate Polymers; 90(2012) 1469-1479.
Pengpong, T. et al.; Design, Synthesis and In-Vitro Evaluation of Mucoadhesive P-Coumarate-Thiolated-Chitosan as a Hydrophobic Drug Carriers; European Journal of Pharmaceutics and Biopharmaceutics; 86 (2014) 487-497.
Sanjust, E.; et al.; Modified Cross-Linked Polyvinyl Alcohol as a Support for Protein Immobilization; Materials Engineering 1994, vol. 5; n. 1, pp. 69-79.
Sato, T., et al.; Synthesis of Poly(vinyl alcohol) Having a Thiol Group at One End and New Block Copolymers Containing Poly(Vinyl Alohol) as One Constituent; Makromol. Chem. 194, 175-185 (1993).

* cited by examiner

*Primary Examiner* — Fred M Teskin
(74) *Attorney, Agent, or Firm* — Jian Zhou

(57) ABSTRACT

The invention is related to a class of hydrophilic copolymers comprising loosely dangling thiol-containing pendant groups. The hydrophilic copolymers are highly reactive towards azetidinium groups of an azetidinium-containing polymer upon heating and can find particular use in for producing water-soluble highly-branched hydrophilic polymeric material useful for producing water gradient contact lenses.

9 Claims, No Drawings

HYDROPHILIC COPOLYMER WITH PENDANT THIOL GROUPS

This application claims the benefit under 35 USC § 119 (e) of U.S. provisional application No. 62/409,948 filed 19 Oct. 2016, incorporated by reference in its entirety.

The present invention generally relates to a class of hydrophilic copolymers comprising thiol-containing pendant groups and to a water-soluble, thermally-crosslinkable polymeric material comprising one or more such hydrophilic copolymers covalently attached thereto.

BACKGROUND

A new class of soft contact lenses, water gradient silicone hydrogel contact lenses, have been developed and successfully introduced in the market. This new class of silicone hydrogel contact lenses is characterized by having a water-gradient structural configuration, an increase from 33% to over 80% water content from core to surface. This unique design delivers a highly-lubricious and extremely-soft lens surface. Such soft contact lenses can be produced according to a cost-effective approach that is described in U.S. Pat. No. 8,529,057 (herein incorporated by reference in its entirety) and involves a step of crosslinking and covalently attaching of a water-soluble highly-branched hydrophilic polymeric material onto lens surfaces to form surface gels.

According to U.S. Pat. No. 8,529,057, a water-soluble highly-branched hydrophilic polymeric material is prepared by partially reacting a polyamidoamine-epichlorohydrin (PAE) with a wetting agent, at various concentration ratio of PAE to the wetting agent and at a reaction temperature for a given reaction time, to achieve a desired lubricity of the surface gels while minimizing or eliminating surface defects (e.g., surface cracking, etc.). Although this new approach can provide hydrogel contact lenses having a water-gradient structural configuration, its applicability and advantages can be limited by the limited availability of hydrophilic copolymers having a versatility and controllability in the levels of reactivity and/or contents of reactive functional group towards the azetidinium groups of PAE.

Therefore, there is still a need for reactive hydrophilic polymers having desired level of reactivity and/or contents of reactive functional groups for producing water-soluble highly-branched hydrophilic polymeric material useful for producing water gradient contact lenses.

SUMMARY OF THE INVENTION

The invention, in one aspect, provides a hydrophilic polymer comprising thiol-containing pendant groups of

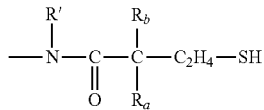

in which R' is hydrogen or a $C_1$-$C_6$ alkyl group, $R_a$ is hydrogen or methyl, and $R_b$ is hydrogen, $C_1$-$C_3$ alkyl, acetyl, or $C_2$-$C_4$ alkanoylamino which optionally has a carboxyl group.

The invention, in another aspect, provides a water-soluble thermally-crosslinkable polymeric material, which comprises (a) one or more first polymer chain of an azetidinium-containing polymer having azetidinium groups, (b) one or more second polymer chains of a hydrophilic polymer having thiol-containing pendant groups of

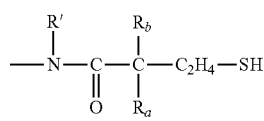

in which R' is hydrogen or a $C_1$-$C_6$ alkyl group, $R_a$ is hydrogen or methyl, and $R_b$ is hydrogen, $C_1$-$C_3$ alkyl, acetyl, or $C_2$-$C_4$ alkanoylamino which optionally has a carboxyl group, wherein each second polymer chain is covalently attached to one of said one or more first polymer chains via one or more linkages of

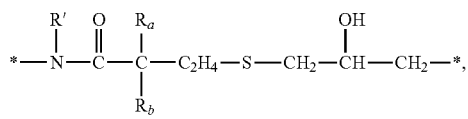

and (c) azetidinium groups each of which is embedded in or covalently attached to one of said one or more first polymer chains.

The invention, in a further aspect, provides a packaging solution, which is an aqueous solution comprising at least one buffering agent for maintaining a pH of from about 6.0 to about 8.5 and from about 0.01% to about 2% by weight of a water-soluble and thermally-crosslinkable hydrophilic polymeric material of the invention, wherein the packaging solution has a tonicity of from about 200 to about 450 milliosmol (mOsm) and a viscosity of from about 1 centipoise to about 20 centipoises at 25° C.

This and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material. A person skilled in the art knows very well how to make contact lenses (either non-silicone hydrogel contact lenses or silicone hydrogel contact lenses). For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses.

A "soft contact lens" refers to a contact lens which has an elastic modulus (i.e., Young's modulus) of less than 2.5 MPa.

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

"Surface hydrophilicity", as used herein, describes a surface property that represents the extent to which a surface interacts with water, as measured by water-break-up-time (WBUT). The higher the value of WBUT is, the higher the surface hydrophilicity is.

In accordance with the invention, the "surface lubricity" of a contact lens (or a medical device) is measured by a friction rating which is a number from 0 to 4. The higher the value of friction rating is, the lower the surface lubricity is.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.05% by weight at room temperature (i.e., a temperature of about 22° C. to about 28° C.). The term "water-soluble", in reference to a compound or material in water, means that the compound or material can be dissolved in water to give a solution with a concentration of at least about 0.05% by weight at room temperature The term "insoluble", in reference to a compound or material in a solvent, means that the compound or material can be dissolved in the solvent to give a solution with a concentration of less than 0.005% by weight at room temperature (as defined above).

As used in this application, the term "ethylenically unsaturated group" is employed herein in a broad sense and is intended to encompass any groups containing at least one >C=C< group. Exemplary ethylenically unsaturated groups include without limitation (meth)acryloyl

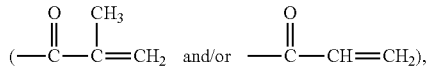

allyl, vinyl, styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "macromer" or "prepolymer" refers to a compound or polymer that contains ethylenically unsaturated groups and has an average molecular weight of greater than 700 Daltons.

As used in this application, the term "vinylic crosslinker" refers to a compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the weight-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ alkanoylamino, $C_1$-$C_4$ alkylamino, di-$C_1$-$C_4$ alkylamino, halogen atom (Br or Cl), and combinations thereof.

The term "alkanoylamino" or "acylamino" refers to a monovalent radical of

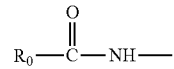

in which $R_0$ is an unsubstituted or substituted alkyl group.

In this application the term "azetidinium" or "3-hydroxyazetidinium" refers to a positively-charged, divalent radical (or group or moiety) of

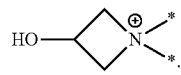

The term "azlactone" refers to a mono-valent radical of formula

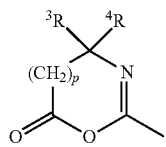

in which p is 0 or 1; $^3R$ and $^4R$ independently of each other is $C_1$-$C_8$ alkyl (preferably methyl).

As used in this application, the term "phosphorylcholine" refers to a monovalent zwitterionic group of

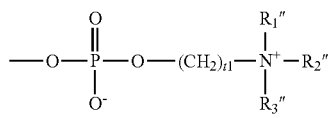

in which t1 is an integer of 1 to 5 and $R_1''$, $R_2''$ and $R_3''$ independently of one another are $C_1$-$C_8$ alkyl or $C_1$-$C_8$ hydroxyalkyl.

In this application, an "oxazoline" refers to a compound of

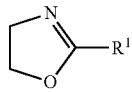

in which $R^1$ is hydrogen, $C_1$-$C_{18}$ alkyl, $C_1$-$C_4$ alkyl-substituted phenyl, $C_1$-$C_4$-alkoxy-substituted phenyl, $C_6$-$C_{18}$ aryl radical, N-pyrrolidonyl-$C_1$-$C_4$ alkyl, a monovalent radical of -alk-$(OC_2H_4)_{m3}$—OR' (in which alk is $C_1$-$C_6$ alkyl diradical, R" is $C_1$-$C_4$ alkyl, preferably methyl, and m3 is an integer from 1 to 10 (preferably 1 to 5)), preferably $R^1$ is methyl, ethyl, propyl, N-pyrrolidonyl-$C_1$-$C_4$ alkyl, a monovalent radical of -alk-$(OC_2H_4)_{m3}$—OR" (in which alk is $C_1$-$C_6$ alkyl diradical, R" is $C_1$-$C_4$ alkyl, preferably methyl, and m3 is an integer from 1 to 10 (preferably 1 to 5)).

In this application, the term "polyoxazoline" refers to a linear polymer having a formula of

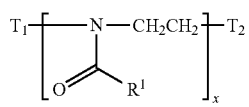

in which: $T_1$ and $T_2$ are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

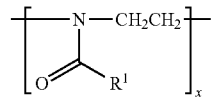

in which $R^1$ and x are as defined above.

In this application, the term "poly(2-oxazoline-co-ethyleneimine)" refers to a statistical copolymer having a formula of

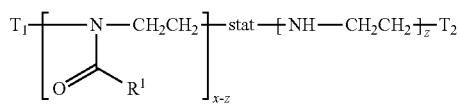

in which: $T_1$ and $T_2$ are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly(2-oxazoline-co-ethyleneimine)-epichlorohydrin are disclosed in U.S. pat. Appl. pub. No. 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "water contact angle" refers to an average water contact angle (i.e., contact angles measured by Sessile Drop method) at the room temperature, which is obtained by averaging measurements of contact angles with at least 3 individual contact lenses.

The term "intactness" in reference to a coating on a silicone hydrogel contact lens is intended to describe the extent to which the contact lens can be stained by Sudan Black in a Sudan Black staining test described in Example 1. Good intactness of the coating on a silicone hydrogel contact lens means that there is practically no Sudan Black staining of the contact lens.

The term "durability" in reference to a coating on a silicone hydrogel contact lens is intended to describe that the coating on the silicone hydrogel contact lens can survive a desired number of cycles of manual rubbing.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

An "aqueous solution" or a "water-based solution" interchangeably refers to a solution which is a homogeneous mixture consisting of a water-based solvent and one or more solutes dissolved in the water-based solvent. A "water-based solvent" is intended to describe a solvent system which consists of at least 50% (preferably at least about 60%, more preferably at least about 80%, even more preferably at least about 90%, in particular at least about 95%) by weight of water and at most 50% (preferably about 40% or less, more preferably about 20% or less, even more preferably about 10% or less, in particular about 5% or less) by weight of one or more organic solvents relative to the weight of the solvent system. An aqueous coating solution refers to an aqueous solution containing at least one polymeric coating material as a solute in the solution.

An "organic-based solution" refers to a solution which is a homogeneous mixture consisting of an organic-based solvent and one or more solutes dissolved in the organic based solvent. An "organic-based solvent" is intended to describe a solvent system which consists of one or more organic solvents and less than 49%, preferably about 40% or less, more preferably about 20% or less, even more preferably about 10% or less, in particular about 5% or less by weight of water relative to the weight of the solvent system. An organic-based coating solution refers to an organic-based solution containing at least one polymeric coating material as a solute in the solution.

An "in-package-crosslinking process" or "IPC process" refers to a crosslinking reaction carried out in-situ directly in a packaging solution in a package (which is for storing and sterilizing a contact lens or a medical device) during autoclave. Examples of such processes are described in U.S. Pat. No. 8,529,057 (herein incorporated by reference in its entirety). A non-silicone hydrogel coating can be formed on a medical device or a contact lens.

The invention is generally related to a class of hydrophilic polymer having thiol-containing pendant groups. Such hydrophilic polymers have loosely-dangling thiol groups which have a high reactivity towards azetidinium groups of an azetidinium-containing polymer and are suitable for efficiently producing water-soluble thermally-crosslinkable polymeric material useful for producing water gradient contact lenses from an aqueous reactive mixture including an azetidinium-containing polymer and such a reactive hydrophilic polymer. It is believed that, because of the higher reactivity of loosely-dangling thiol groups towards azetidinium groups compared to secondary amino groups of an azetidinium-containing polymer, during the reaction for preparing a water-soluble thermally-crosslinkable polymeric material, a reactive hydrophilic polymer (with loosely-dangling thiol pendant groups) of the invention can be incorporated into resultant thermally-crosslinkable polymeric material so efficiently that inter-crosslinking of azetidinium-containing polymer molecules may be minimized. The advantages of using a reactive hydrophilic polymer may include a relatively-short reaction time to save the production cost, an efficient reaction to use a smaller amount of an expensive hydrophilicity-enhancing agent, and a better reaction controllability in the concentrations of azetidinium groups and covalent linkages in the water-soluble thermally-crosslinkable polymeric material suitable for forming a surface hydrogel with better lubricity and minimal or no surface cracking.

The invention, in one aspect, provides a hydrophilic polymer comprising thiol-containing pendant groups of

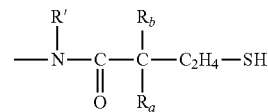

in which R' is hydrogen or a $C_1$-$C_6$ alkyl group (preferably hydrogen or methyl, more preferably hydrogen), $R_a$ is hydrogen or methyl, and $R_b$ is hydrogen, $C_1$-$C_3$ alkyl, acetyl, or $C_2$-$C_4$ alkanoylamino which optionally has a carboxyl group (preferably acetylamino, propionylamino or butyrylamino, more preferably acetylamino or propionylamino, even more preferably acetylamino). Preferably, the invention provides three types of hydrophilic copolymers reactive towards azetidinium-containing polymers In one embodiment of the invention, a hydrophilic polymer is a first copolymer which comprises: at least about 50% by mole of repeating units of vinyl alcohol

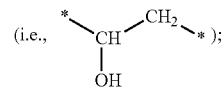

and repeating units of formula (1)

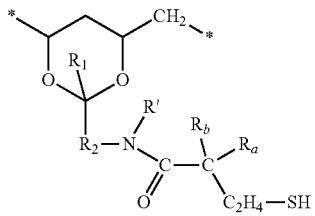

in which: R' and $R_1$ independent of each other are hydrogen or a $C_1$-$C_6$ alkyl group (preferably hydrogen or methyl, more preferably hydrogen), $R_2$ is a $C_2$-$C_6$ alkylene divalent radical (preferably a $C_3$-$C_4$ alkylene divalent radical, more preferably methylene or ethylene divalent radical, even more preferably propylene divalent radical), $R_a$ is hydrogen or methyl, and $R_b$ is hydrogen, $C_1$-$C_3$ alkyl, acetyl, or $C_2$-$C_4$ alkanoylamino which optionally has a carboxyl group (preferably acetylamino, propionylamino or butyrylamino, more preferably acetylamino or propionylamino, even more preferably acetylamino). Preferably, the first copolymer further comprises repeating units of

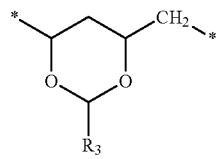

in which $R_3$ is a $C_1$-$C_6$ alkyl, repeating units of vinyl acetate, repeating units of 3,4-dihydroxy-1-butene, repeating units of N-vinylpyrrolidone, or a combination thereof.

Such hydrophilic copolymers can be obtained from starting materials including (a) an acetal-containing amine (e.g.,

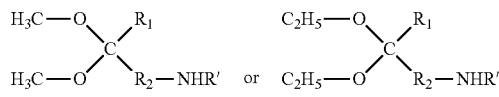

in which R', $R_1$, and $R_2$ are as defined in formula (1)), (b) a polyvinylalcohol (a fully hydrolyzed or partially hydrolyzed form of polyvinylacetate), a polyvinylalcohol copolymer (e.g., a copolymer of vinyl alcohol with 3,4-dihydroxy-1-butene and/or N-vinylpyrrolidone), or a polyvinylalcohol chemically modified with a dimethyl acetal and (c) a thiolactone according to procedures illustrated in Scheme 1:

Scheme 1

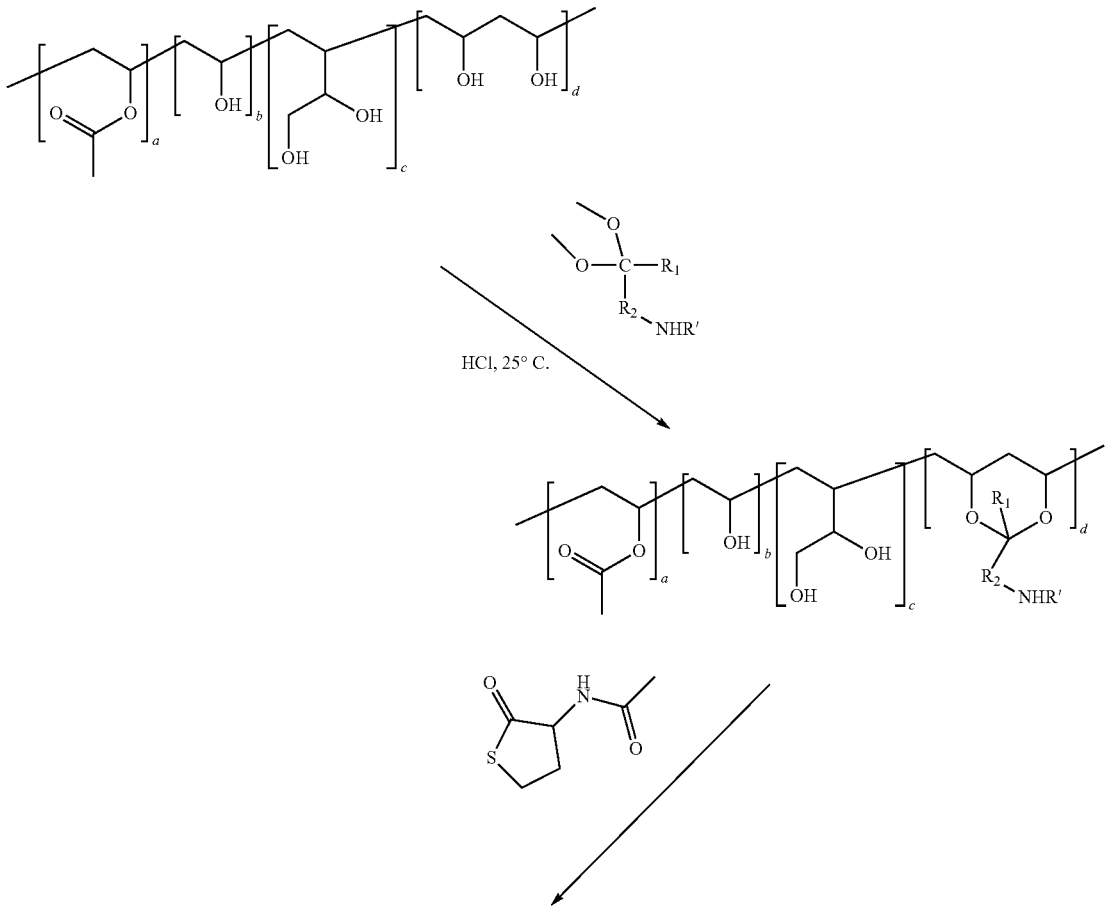

-continued

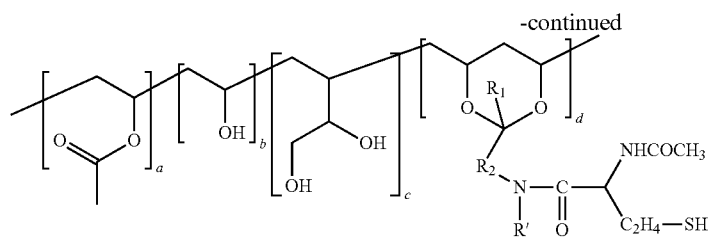

It is understood that, in the second step in Scheme 1, N-acetyl homocysteine thiolactone can be substituted with any thiolactone to obtain a hydrophilic copolymer of the invention. Examples of preferred commercially-available thiolactone include without limitation 4-butyrothiolactone (or dihydro-2(3H)-thiophenone), 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 3-acetyldihydro-2(3H)-thiophenone, N-acetyl homocysteine thiolactone, N-propionyl homocysteine thiolactone, N-butyryl homocysteine thiolactone, and N-carboxypropionyl homocysteine thilactone (or 4-oxo-4-[(tetrahydro-2-oxo-3-thienyl)amino]-butanoic acid).

In another embodiment of the invention, a hydrophilic polymer is a second copolymer (i.e., a polysaccharide) which comprises: repeating units of D-glucosamine; and repeating units of formula (2)

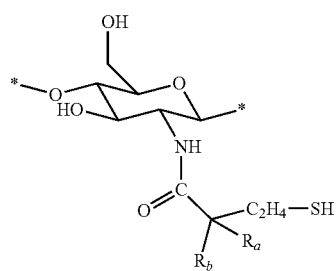

(2)

in which $R_a$ is hydrogen or methyl, and $R_b$ is hydrogen, $C_1$-$C_3$ alkyl, acetyl, or $C_2$-$C_4$ alkanoylamino which optionally has a carboxyl group (preferably acetylamino, propionylamino or butyrylamino, more preferably acetylamino or propionylamino, even more preferably acetylamino). Preferably, the second copolymer further comprises repeating units of N-acetylglucosamine.

Such polysaccharides can be obtained from a poly(D-glucosamine) (a fully hydrolyzed or partially hydrolyzed form of poly(N-acetylglucosamine), e.g., chitin) and a thiolactone according to procedures illustrated in Scheme 2:

Scheme 2

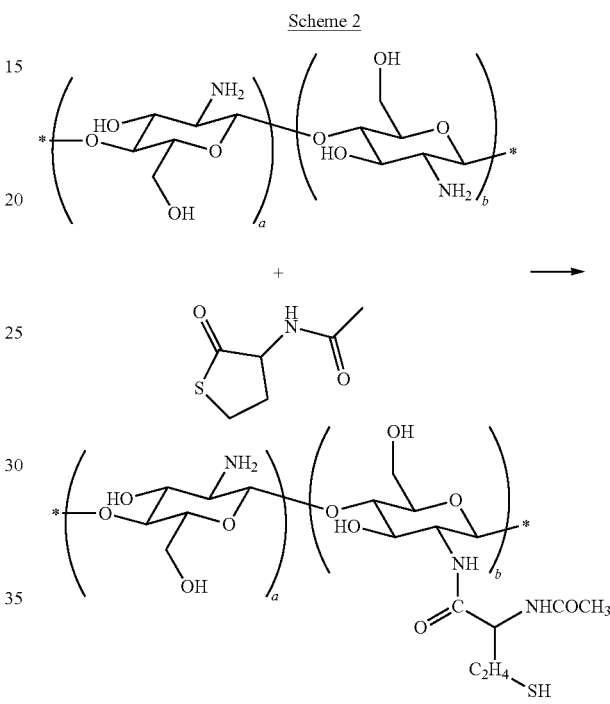

It is understood that, in the second step in Scheme 2, N-acetyl homocysteine thiolactone can be substituted with any thiolactone (preferably any commercially-available thiolactone described above) to obtain a hydrophilic copolymer of the invention.

In a further embodiment of the invention, a hydrophilic polymer is a third copolymer which comprises: at least about 50% by mole of repeating units of at least one non-reactive vinylic monomer selected from the group consisting of a phosphorylcholine-containing vinylic monomer, (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof (preferably selected from the group consisting of (meth)acryloyloxyethyl phosphorylcholine, (meth)acrylamide, N,N-dimethyl (meth)acrylamide, N-vinylpyrrolidone, N-vinyl-N-methyl acetamide, glycerol (meth)acrylate, hydroxyethyl (meth)acrylate, N-hydroxyethyl (meth)acrylamide, N-hydroxypropyl (meth)acrylamide, $C_1$-$C_4$-alkoxy polyethylene glycol (meth)acrylate having a weight average molecular weight of up to 400 Daltons, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, and combinations thereof, more preferably selected from the group consisting of (meth)acryloyloxyethyl phosphorylcholine, acrylamide, N,N-dimethylacrylamide, N-vinylpyrrolidone (NVP), N-vinyl-N-methyl acetamide, glycerol (meth)acrylate, hydroxyethyl (meth) acrylate, N-hydroxyethyl (meth)acrylamide, N-hydroxypropyl (meth)acrylamide, $C_1$-$C_4$-alkoxy polyethylene glycol (meth)acrylate having a weight average molecular weight of up to 400 Daltons, N,N-dimethylaminoethyl (meth)acrylate, N,N-dimethylaminopropyl (metha)crylamide, and combinations thereof); and repeating units of formula (3).

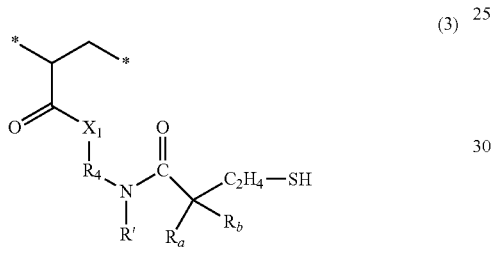

(3)

in which $X_1$ is oxygen or NR', R' is hydrogen or a $C_1$-$C_6$ alkyl group, $R_4$ is a $C_1$-$C_6$ alkyl group, $R_a$ is hydrogen or methyl, and $R_b$ is hydrogen, $C_1$-$C_3$ alkyl, acetyl, or $C_2$-$C_4$ alkanoylamino (e.g., acetylamino, propionylamino, butyrylamino) which optionally has a carboxyl group (preferably acetylamino, propionylamino or butyrylamino, more preferably acetylamino or propionylamino, even more preferably acetylamino). Preferably, the third copolymer comprises from about 50% to about 98% by mole (more preferably from about 60% to about 95% by mole, even more preferably from about 70% to about 90% by mole) of repeating units of said one or more non-reactive vinylic monomers.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy) propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy) pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy) butyl-2'-(trimethylammonio)ethylphosphate, 2-((meth)acryloyloxy) pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof. Phosphorylcholine-containing vinylic monomers can be prepared according to procedures described in U.S. Pat. Nos. 5,461,433 and 5,741,923 (herein incorporated by references in their entireties).

Such third copolymers can be obtained from a copolymer of an amino-containing vinylic monomer (i.e., a primary or secondary amino-containing vinylic monomer) and one or more non-reactive vinylic monomers (as described above) and a thiolactone according to procedures illustrated in Scheme 3:

Scheme 3

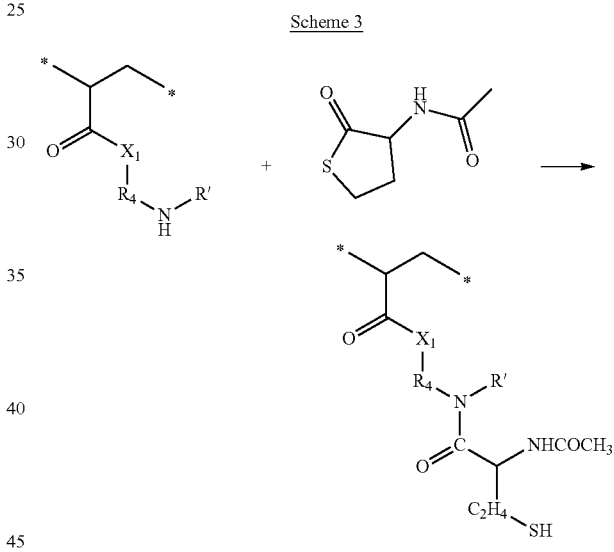

It is understood that, in the second step in Scheme 3, N-acetyl homocysteine thiolactone can be substituted with any thiolactone (preferably any commercially-available thiolactone described above) to obtain a hydrophilic copolymer of the invention.

A copolymer of an amino-containing vinylic monomer and one or more non-reactive vinylic monomers (as described above) can be obtained from commercial sources or alternatively can be prepared by free-radical polymerization of a monomer mixture including at least one non-reactive vinylic monomers and an amino-containing vinylic monomer in the presence of free-radical initiator and optionally a chain transfer agent, as well known to a person skilled in the art. Examples of preferred amino-containing vinylic monomers include without limitation amino-$C_2$-$C_6$ alkyl (meth)acrylate, $C_1$-$C_6$ alkylamino-$C_2$-$C_6$ alkyl (meth)acrylate, amino-$C_2$-$C_6$ alkyl (meth)acrylamide, $C_1$-$C_6$ alkylamino-$C_2$-$C_6$ alkyl (meth)acrylamide, and combinations thereof.

In accordance with the invention, a hydrophilic polymer of the invention has a weight average molecular weight of from about 500 to about 2,000,000, preferably from about 1,000 to about 1,000,000, more preferably from about 2,000 to about 500,000 Daltons.

A hydrophilic polymer of the invention can find particular use in forming a water-soluble and thermally crosslinkable hydrophilic polymeric material containing azetidinium groups. Such a water-soluble and thermally crosslinkable hydrophilic polymeric material can be obtained by partially reacting a reactive hydrophilic polymer with an azetidinium-containing polymer according to procedures similar to what described in U.S. Pat. No. 8,529,057 (herein incorporated by reference in its entirety) and can be especially useful for producing water gradient contact lenses. One azetidinium group of an azetidinium-containing polymer can react with one thiol group of a hydrophilic polymer of the invention according to the following reaction

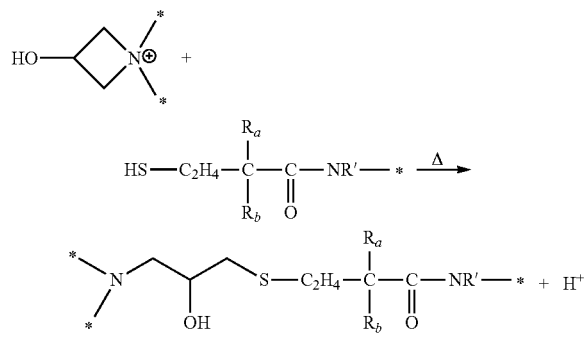

The invention, in another aspect, provides a water-soluble thermally-crosslinkable polymeric material, which comprises (a) one or more first polymer chain of an azetidinium-containing polymer having azetidinium groups, (b) one or more second polymer chains of a hydrophilic polymer of the invention (any one of those described above), wherein each second polymer chain is covalently attached to one of said one or more first polymer chains via one or more linkages of

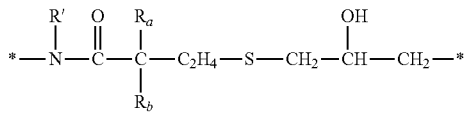

in which R' is hydrogen or a $C_1$-$C_6$ alkyl group, $R_a$ is hydrogen or methyl, and $R_b$ is hydrogen, $C_1$-$C_3$ alkyl, acetyl, or $C_2$-$C_4$ alkanoylamino (e.g., acetylamino, propionylamino, butyrylamino) which optionally has a carboxyl group (preferably acetylamino, propionylamino or butyrylamino, more preferably acetylamino or propionylamino, even more preferably acetylamino), and (c) azetidinium groups each of which is embedded in or covalently attached to one of said one or more first polymer chains.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931 (herein incorporated by reference in its entirety). A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. 2016/0061995 A1 (herein incorporated by reference in its entirety).

Homopolymers and copolymers of an azetidinium-containing vinylic monomer can be obtained according to the procedures described in U.S. Pat. Appl. Pub. No. 2012/0337160A1 (herein incorporated by reference in its entirety).

Water-soluble and thermally-crosslinkable hydrophilic polymeric materials can be prepared according to the processes disclosed in U.S. Pat. Appli. Pub. Nos. US 2016/0061995 A1 and US2013/0337160 A1 (herein incorporated by reference in their entireties) and in U.S. Pat. No. 8,529,057 (herein incorporated by reference in its entirety).

In a preferred embodiment, a water-soluble thermally-crosslinkable polymeric material can be obtained by heating an aqueous reactive solution, which comprises at least one azetidinium-containing polymer and at least one hydrophilic polymer of the invention (any one described above), to a temperature of from about 35° C. to about 85° C. and maintaining the temperature for a period of time sufficient (about 6 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 8.0 (preferably at least 8.5, more preferably at least 9.0, even more preferably at least 9.5). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilic polymer. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, NH$_4$OH, or mixture thereof) or an acid (e.g., HCl, H$_2$SO$_4$, H$_3$PO$_4$, citric acid, acetic acid, boric acid, or mixture thereof).

In accordance with the invention, any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. NaH$_2$PO$_4$, Na$_2$HPO$_4$, Na$_3$PO$_4$, KH$_2$PO$_4$, K$_2$HPO$_4$, K$_3$PO$_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., Na$_2$CO$_3$, NaHCO$_3$, K$_2$CO$_3$, KHCO$_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

In accordance with the invention, the concentration ratio of a reactive hydrophilic polymer relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a reactive hydrophilic polymer of the invention, the concentration ratio of the azetidinium-containing polymer to the reactive hydrophilic polymer of the invention is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of second polymer chains derived from at least one reactive hydrophilic polymer of the invention, wherein the second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one thiol group of the reactive hydrophilic polymer of the invention, and (iii) azetidinium groups which are parts of the first polymer chains or pendant or terminal groups covalently attached to the first polymer chains. The composition of the water-soluble thermally-crosslinkable polymeric material is determined by the composition (based on the total weight of the reactants) of a reactant mixture used for such a polymer. For example, if a reactant mixture comprises about 75% by weight of a polyamidoamine-epichlorohydrin and about 25% by weight of at least one reactive hydrophilic polymer of the invention based on the total weight of the reactants (excluding solvent), then the resultant water-soluble thermally-crosslinkable polymeric material comprises about 75% by weight of first polymer chains derived from the polyamioamine-epichlorohydrin and about 25% by weight of second polymer chains derived from said at least one reactive hydrophilic polymer of the invention.

A water-soluble thermally-crosslinkable polymeric material produced according to a method of the invention can find particular use in preparing a packaging solution used for packaging and autoclaving medical devices, especially contact lenses. Such a packaging solution is especially suitable for forming a relatively-thick and soft hydrogel coatings on hydrogel contact lenses or medical devices according to the in-package-crosslinking (IPC) processes described in U.S. Pat. No. 8,529,057 (herein incorporated by reference in its entirety). The resultant hydrogel coatings can have a superior lubricity (a friction rating of 0) with minimized or no surface cracking.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and autoclaved (a sterilization procedure involving heating the packaging of a contact lens to a temperature of from about 118° C. to about 125° C. for approximately 20-40 minutes under pressure) prior to dispensing to users. A person skilled in the art will understand well how to seal and autoclave lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., polyethylene glycol, cellulose derivatives, polyvinyl alcohol, polyvinylpyrrolidone).

The packaging solution contains a buffering agent in an amount sufficient to maintain a pH of the packaging solution in the desired range, for example, preferably in a physiologically acceptable range of 6.5 to 7.5. Any known, physiologically compatible buffering agents can be used. Suitable buffering agents as a constituent of the contact lens care composition according to the invention are known to the person skilled in the art. Examples are borate buffers, citrate buffers, bicarbonate buffers, phosphate buffers, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N, N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N, N'-bis(2-ethanesulfonic acid), TES (N-[Tris (hydroxymethyl)methyl]-2-aminoethanesulfonic acid), salts thereof. Preferably, the buffering agents are phosphate buffers, borate buffers, or combinations thereof. The amount of each buffer agent in a packaging solution is preferably from 0.01% to 0.8%; most preferably from about 0.02% to about 0.4% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 5 centipoises, at 25° C.

The packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material of the invention.

In accordance with the invention, during autoclave, a water-soluble thermally-crosslinkable polymeric material of the invention can be crosslinked effectively with the functional groups (e.g., amino groups, thiol groups, and/or carboxylic acid groups) on and/or near the surface of a hydrogel contact lens (or a medical device) to form a crosslinked hydrogel coating which are wettable and ophthalmically compatible, while those azetidinium groups which do not participate in crosslinking reaction may be hydrolyzed into 2,3-dihydroxypropyl (HO—CH$_2$—CH(OH)—CH$_2$—) groups. After autoclave, the water-soluble thermally-crosslinkable polymeric material present in the lens packaging solution, if applicable, would have been converted to a non-reactive polymeric wetting agent capable of improving a lens's insert comfort.

The invention, in a further aspect, provides a packaging solution, which is an aqueous solution comprising at least one buffering agent for maintaining a pH of from about 6.0 to about 8.5 and from about 0.01% to about 2% by weight of a water-soluble and thermally-crosslinkable hydrophilic polymeric material of the invention (any one of those described above), wherein the packaging solution has a tonicity of from about 200 to about 450 milliosmol (mOsm) and a viscosity of from about 1 centipoise to about 20 centipoises at 25° C.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A hydrophilic polymer, which is a first copolymer, a second copolymer, or a third copolymer, wherein the first copolymer comprises at least about 50% by mole of repeating units of vinyl alcohol

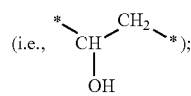

and repeating units of formula (1)

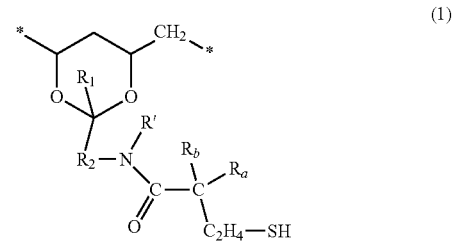

wherein the second copolymer comprises repeating units of D-glucosamine; and repeating units of formula (2),

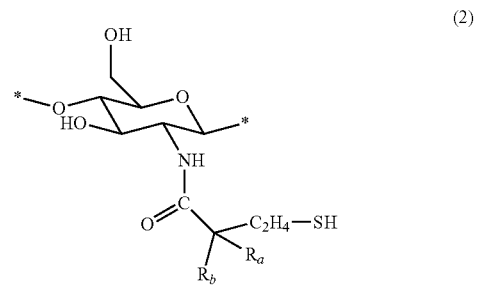

wherein the third copolymer comprises at least about 50% by mole of repeating units of at least one non-reactive vinylic monomer selected from the group consisting of a phosphorylcholine-containing vinylic monomer, (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof, and repeating units of formula (3)

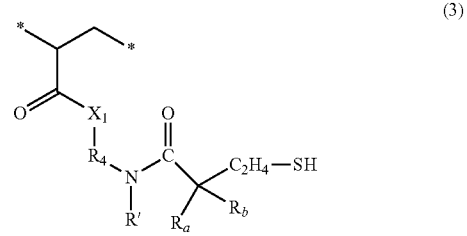

wherein in formula (1) to (3), $X_1$ is oxygen or NR', R' and $R_1$ independent of each other are hydrogen or a $C_1$-$C_6$ alkyl group, $R_2$ is a $C_2$-$C_6$ alkylene divalent radical, $R_4$ is a $C_1$-$C_6$ alkyl group, $R_a$ is hydrogen or methyl, and $R_b$ is hydrogen, $C_1$-$C_3$ alkyl, acetyl, or $C_2$-$C_4$ alkanoylamino which optionally has a carboxyl group.

2. The hydrophilic polymer of invention 1, wherein $R_a$ is hydrogen and $R_b$ is acetylamino, propionylamino or butyrylamino.

3. The hydrophilic polymer of invention 1, wherein $R_a$ is hydrogen and $R_b$ is acetylamino or propionylamino.

4. The hydrophilic polymer of invention 1, wherein $R_a$ is hydrogen and $R_b$ is acetylamino.

5. The hydrophilic polymer of any one of invention 1 to 4, which is the first copolymer.

6. The hydrophilic polymer of invention 5, wherein, in formula (1), R' and $R_1$ independent of each other are hydrogen or methyl.

7. The hydrophilic polymer of invention 5, wherein in formula (1), R' and $R_1$ independent of each other are hydrogen.

8. The hydrophilic polymer of any one of inventions 5 to 7, wherein in formula (1), $R_2$ is a $C_2$-$C_4$ alkylene divalent radical.

9. The hydrophilic polymer of any one of inventions 5 to 7, wherein in formula (1), $R_2$ is propylene divalent radical.

10. The hydrophilic polymer of any one of inventions 5 to 7, wherein in formula (1), $R_2$ is methylene divalent radical.

11. The hydrophilic polymer of any one of inventions 5 to 10, wherein the first copolymer further comprises repeating units of

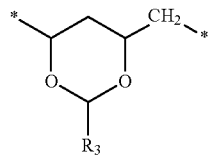

in which $R_3$ is a $C_1$-$C_6$ alkyl, repeating units of vinyl acetate, repeating units of 3,4-dihydroxy-1-butene, repeating units of N-vinylpyrrolidone, or a combination thereof.

12. The hydrophilic polymer of any one of inventions 1 to 4, which is the second copolymer.

13. The hydrophilic polymer of invention 12, wherein the second copolymer further comprises repeating units of N-acetylglucosamine.

14. The hydrophilic polymer of any one of inventions 1 to 4, which is the third copolymer.

15. The hydrophilic polymer of invention 14, wherein the third copolymer comprises repeating units of a phosphorylcholine-containing vinylic monomer.

16. The hydrophilic polymer of invention 15, wherein the phosphorylcholine-containing vinylic monomer is (meth)acryloyloxyethyl phosphorylcholine.

17. The hydrophilic polymer of any one of inventions 14 to 16, wherein the third copolymer comprises repeating units of a non-reactive hydrophilic vinylic monomer selected from the group consisting of (meth)acrylamide, N,N-dimethyl (meth)acrylamide, N-vinylpyrrolidone, N-vinyl-N-methyl acetamide, glycerol (meth)acrylate, hydroxyethyl (meth)acrylate, N-hydroxyethyl (meth)acrylamide, N-hydroxypropyl (meth)acrylamide, $C_1$-$C_4$-alkoxy polyethylene glycol (meth)acrylate having a weight average molecular weight of up to 400 Daltons, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, and combinations thereof.

18. The hydrophilic polymer of any one of inventions 14 to 16, wherein the third copolymer comprises repeating units of a non-reactive hydrophilic vinylic monomer selected from the group consisting of acrylamide, N,N-dimethylacrylamide, N-vinylpyrrolidone (NVP), N-vinyl-N-methyl acetamide, glycerol (meth)acrylate, hydroxyethyl (meth)acrylate, N-hydroxyethyl (meth)acrylamide, N-hydroxypropyl (meth)acrylamide, $C_1$-$C_4$-alkoxy polyethylene glycol (meth)acrylate having a weight average molecular weight of up to 400 Daltons, N,N-dimethylaminoethyl (meth)acrylate, N,N-dimethylaminopropyl (metha)crylamide, and combinations thereof.

19. The hydrophilic polymer of any one of inventions 14 to 18, wherein the third copolymer comprises from about 50% to about 98% by mole of repeating units of said one or more non-reactive vinylic monomers.

20. The hydrophilic polymer of any one of inventions 14 to 18, wherein the third copolymer comprises from about 60% to about 95% by mole of repeating units of said one or more non-reactive vinylic monomers.

21. The hydrophilic polymer of any one of inventions 14 to 18, wherein the third copolymer comprises from about 70% to about 90% by mole of repeating units of said one or more non-reactive vinylic monomers.

22. A water-soluble thermally-crosslinkable polymeric material, comprising:
   (a) one or more first polymer chain of an azetidinium-containing polymer having azetidinium groups;
   (b) one or more second polymer chains of a hydrophilic polymer of any one of inventions 1 to 21, wherein each second polymer chain is covalently attached to one of said one or more first polymer chains via one or more linkages of

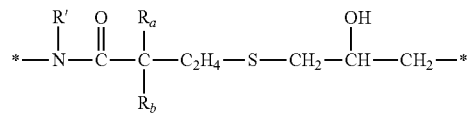

in which R', $R_a$ and $R_b$ are as defined in any one of inventions 1 to 4; and
   (c) azetidinium groups each of which is embedded in or covalently attached to one of said one or more first polymer chains.

23. The water-soluble thermally-crosslinkable polymeric material of invention 22, wherein the azetidinium-containing polymer is polyamidoamine-epichlorohydrin (PAE).

24. The water-soluble thermally-crosslinkable polymeric material of invention 22, wherein the azetidinium-containing polymer is a poly(2-oxazoline-co-ethyleneimine)-epichlorohydrin.

25. The water-soluble thermally-crosslinkable polymeric material of invention 22, wherein the azetidinium-containing polymer is a homopolymer of an azetidinium-containing vinylic monomer.

26. The water-soluble thermally-crosslinkable polymeric material of invention 22, wherein the azetidinium-containing polymer is a copolymer of an azetidinium-containing vinylic monomer with one or more hydrophilic vinylic monomers.

27. The water-soluble thermally-crosslinkable polymeric material of any one of inventions 22 to 26, wherein the water-soluble thermally-crosslinkable polymeric material comprises (i) from about 20% to about 95% by weight of the first polymer chains and (ii) from about 5% to about 80% by weight of the second polymer chains.

28. A packaging solution, which is an aqueous solution comprising at least one buffering agent for maintaining a pH of from about 6.0 to about 8.5 and from about 0.01% to about 2% by weight of a water-soluble and thermally-crosslinkable hydrophilic polymeric material of any one of inventions 22 to 27, wherein the packaging solution has a tonicity of from about 200 to about 450 milliosmol (mOsm) and a viscosity of from about 1 centipoise to about 20 centipoises at 25° C.

29. The packaging solution of invention 28, wherein the aqueous solution comprises from about 0.05% to about 1.5% by weight of the water-soluble thermally-crosslinkable hydrophilic polymeric material.

30. The packaging solution of invention 28, wherein the aqueous solution comprises from about 0.1% to about 1% by weight of the water-soluble thermally-crosslinkable hydrophilic polymeric material.

31. The packaging solution of invention 28, wherein the aqueous solution comprises from about 0.2% to about 0.5% by weight of the water-soluble thermally-crosslinkable hydrophilic polymeric material.

32. The packaging solution of any one of inventions 28 to 31, wherein the buffering agents are present in a packaging solution in an amount of from 0.01% to 0.8% (preferably from about 0.02% to about 0.4%) by weight.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

What is claimed is:

1. A hydrophilic polymer, which is a first copolymer or a third copolymer,
wherein the first copolymer comprises at least about 50% by mole of repeating units of vinyl alcohol

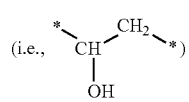

and repeating units of formula (1)

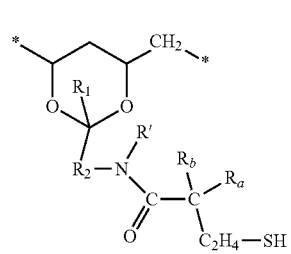

wherein the third copolymer comprises at least about 50% by mole of repeating units of at least one non-reactive vinylic monomer selected from the group consisting of a phosphorylcholine-containing vinylic monomer, (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof, and repeating units of formula (3)

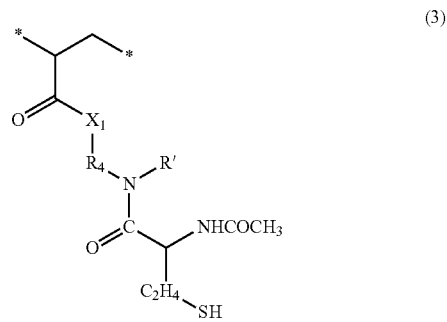

in which: $X_1$ is oxygen or NR'; R' and $R_1$ independent of each other are hydrogen or a $C_1$-$C_4$ alkyl group; $R_2$ is a $C_2$-$C_6$ alkylene divalent radical; $R_4$ is a $C_1$-$C_6$ alkyl group; $R_a$ is hydrogen or methyl; and $R_b$ is hydrogen, $C_1$-$C_3$ alkyl, acetyl, or $C_2$-$C_4$ alkanoylamino which optionally has a carboxyl group.

2. The hydrophilic polymer of claim 1, wherein $R_a$ is hydrogen, and $R_b$ is acetylamino, propionylamino or butyrylamino.

3. The hydrophilic polymer of claim 1, which is the first copolymer.

4. The hydrophilic polymer of claim 3, wherein, in formula (1), R' and $R_1$ independent of each other are hydrogen or methyl, $R_2$ is a $C_2$-$C_4$ alkylene divalent radical.

5. The hydrophilic polymer of claim 3, wherein the first copolymer further comprises repeating units of

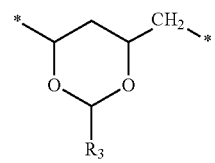

in which $R_3$ is a $C_1$-$C_6$ alkyl, repeating units of vinyl acetate, repeating units of 3,4-dihydroxy-1-butene, repeating units of N-vinylpyrrolidone, or a combination thereof.

6. The hydrophilic polymer of claim 1, which is the third copolymer.

7. The hydrophilic polymer of claim 6, wherein the third copolymer comprises repeating units of a phosphorylcholine-containing vinylic monomer.

8. The hydrophilic polymer of claim 6, wherein the third copolymer comprises repeating units of a non-reactive hydrophilic vinylic monomer selected from the group consisting of (meth)acrylamide, N,N-dimethyl (meth)acrylamide, N-vinylpyrrolidone, N-vinyl-N-methyl acetamide, glycerol (meth)acrylate, hydroxyethyl (meth)acrylate, N-hydroxyethyl (meth)acrylamide, N-hydroxypropyl (meth)acrylamide, $C_1$-$C_4$-alkoxy polyethylene glycol (meth)acrylate having a weight average molecular weight of up to 400 Daltons, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, and combinations thereof.

9. The hydrophilic polymer of claim 6, wherein the third copolymer comprises from about 50% to about 98% by mole of repeating units of said one or more non-reactive vinylic monomers.

\* \* \* \* \*